United States Patent [19]
Adia et al.

[11] Patent Number: 5,685,769
[45] Date of Patent: Nov. 11, 1997

[54] TOOL COMPONENT

[76] Inventors: Moosa Mohammed Adia, 1966 Peacock Street, Lenasia South, Johannesburg, South Africa; Bruce Ringsby Olmstead, 130 Ormonde Drive, Mondeor, Johannesburg, South Africa

[21] Appl. No.: 358,830
[22] Filed: Dec. 19, 1994
[30] Foreign Application Priority Data Dec. 21, 1993 [ZA] South Africa ............... 93/9571

[51] Int. Cl.$^6$ ...................................... B24D 3/04
[52] U.S. Cl. ................... 451/540; 51/307; 407/119; 175/434; 175/420
[58] Field of Search ................... 451/540; 51/307; 407/118, 119; 175/420, 420.02, 428, 432, 434, 426

[56] References Cited

U.S. PATENT DOCUMENTS

| | | |
|---|---|---|
| 4,109,737 | 8/1978 | Bovenkerk ............... 175/329 |
| 4,764,434 | 8/1988 | Aronsson et al. . |
| 4,784,023 | 11/1988 | Dennis . |
| 4,861,350 | 8/1989 | Phaal et al. . |
| 5,007,207 | 4/1991 | Phaal . |
| 5,120,327 | 6/1992 | Dennis ...................... 51/293 |
| 5,217,081 | 6/1993 | Waldenstrom et al. ..... 175/420.2 |
| 5,351,772 | 10/1994 | Smith ..................... 175/428 |

FOREIGN PATENT DOCUMENTS 2015081  1/1987  Japan ........................ 451/65

*Primary Examiner*—Robert A. Rose
*Attorney, Agent, or Firm*—Scully, Scott Murphy and Presser

[57] ABSTRACT

A tool component comprises an abrasive compact layer bonded to a cemented carbide substrate along an interface. The abrasive compact layer has a working surface on a side opposite to the interface which is flat and which presents a cutting edge or point on its periphery. A recess is provided, that recess extending into the substrate from the interface. The recess has a shape, in plan, of at least two strips which intersect. Examples of suitable shapes are V-shape and cross-shape. Abrasive compact fills the recess and is bonded to the substrate.

12 Claims, 1 Drawing Sheet

TOOL COMPONENT

BACKGROUND OF THE INVENTION

This invention relates to tool components comprising a composite abrasive compact.

Composite abrasive compacts consist of an abrasive compact layer bonded to a substrate which is generally a cemented carbide substrate. The abrasive compact layer comprises a mass of abrasive particles, typically diamond or cubic boron nitride, bonded into a hard conglomerate. Such layers are polycrystalline in nature and contain a high abrasive particle content. Diamond compacts are also known as polycrystalline diamond or PCD. Cubic boron nitride compacts are also known as polycrystalline cubic boron nitride or PCBN.

Composite abrasive compacts are manufactured under elevated temperature and pressure conditions, e.g. diamond or cubic boron nitride synthesis conditions.

Composite abrasive compacts are used in a variety of cutting, drilling, milling and other such operations. It is an edge or point formed on the abrasive compact layer of such composite compacts which performs the cutting, drilling, milling or other such operation.

Composite diamond abrasive compacts are used extensively in drilling. While they generally perform admirably in drilling, the diamond compact layer does tend to spall or break under some of the stressful conditions which can be encountered during drilling.

U.S. Pat. No. 4,861,350 describes a tool component in the form of a composite abrasive compact wherein the abrasive compact has two zones which are joined by an interlocking, common boundary. The one zone provides the cutting edge or point for the tool component, while the other zone is bonded to a cemented carbide substrate. In one embodiment, the cemented carbide substrate has a central portion extending into the abrasive compact defining a peripheral abrasive compact stepped region surrounding the central portion.

U.S. Pat. No. 5,007,207 discloses a tool insert comprising an abrasive compact bonded to a cemented carbide support. The cutting edge of the tool is provided by the periphery of the compact. A plurality of circular concentric recesses, each filled with abrasive compact material, extend into the cemented carbide support from the compact/carbide interface. The compact-filled grooves are designed to provide, in use, groove-type cutting regions.

SUMMARY OF THE INVENTION

According to the present invention, a tool component comprises an abrasive compact layer bonded to a cemented carbide substrate along an interface;

the abrasive compact layer having a working surface, on a side opposite to the interface, which is flat and which presents a cutting edge or point on its periphery;

a recess extending into the substrate from the interface, the recess having a shape, in plan, of at least two strips which intersect; and a material filling the recess and being bonded to the substrate, the material being different to that of the substrate.

DESCRIPTION OF EMBODIMENTS

Figure 1:
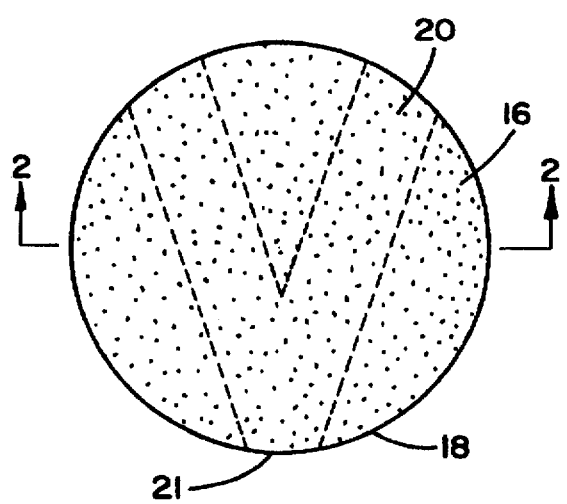
FIGS. 1 and 2 are plan and sectional side views, respectively, of an embodiment of the invention.

The material-filled recess and its location in the cemented carbide substrate has the effect of introducing a compressive pre-stress in the abrasive compact layer thereby strengthening that layer and reducing the incidence of spalling and breakage during use.

The material-filled recess has a shape, in plan, of at least two strips which intersect. The intersection of the strips may be located entirely within the periphery of the cemented carbide substrate, or have at least one surface which is common with this periphery. Examples of suitable shapes, in plan, for the recess are V-shape and cross-shape.

The recess will, of course, have a portion which is located in the interface. The area of that portion will generally be at least 25 percent of the area of the interface. Typically, the area of the portion of the recess in the interface will be less than 95 percent of the area of the interface. Preferably, the area of the portion of the recess in the interface will be 40 to 75 percent of the area of the interface.

The recess may extend a substantial depth into the substrate. The depth will depend on various factors such as the nature of the material which fills the recess and the shape and configuration of the recess.

The base of the recess may be flat or have one or more discontinuities which, when provided, are preferably provided by surfaces which define an angle therebetween.

It is important that the recess be filled with material that is different to the substrate and such as to produce in the compact layer a compressive pre-stress which strengthens that layer. To achieve this, the material will typically be stiffer than the carbide of the substrate, and may also have greater thermal shrinkage and/or thermal expansion properties than the carbide of the substrate.

In one preferred form of the invention, the material is abrasive compact which is the same as the abrasive compact layer. This preferred aspect of the invention has particular application to tool components wherein the abrasive compact layer is a diamond abrasive compact layer.

The material filling the recess may also be a cemented carbide having diamond particles dispersed therein, or a cemented carbide having different characteristics to that of the substrate, e.g. a coarser grain size and/or a high metal binder content.

The cemented carbide for the substrate may be any known in the art such as cemented titanium carbide, cemented tungsten carbide, cemented tantalum carbide, cemented molybdenum carbide, or mixtures thereof. As is known, such cemented carbides will typically have a metal binder content of 3 to 30 percent by mass. The metal binder will typically be cobalt, iron or nickel or an alloy containing one or more of these metals.

The abrasive compact has a working surface on a side opposite to the interface between the compact layer and the cemented carbide substrate. This surface is flat and presents a cutting edge around, or point in its periphery. Typically, this layer will be circular in plan and the circular periphery will provide a continuous cutting edge.

The tool components of the invention have particular application in rotary drill bits for drilling earth formations.

Figure 2:
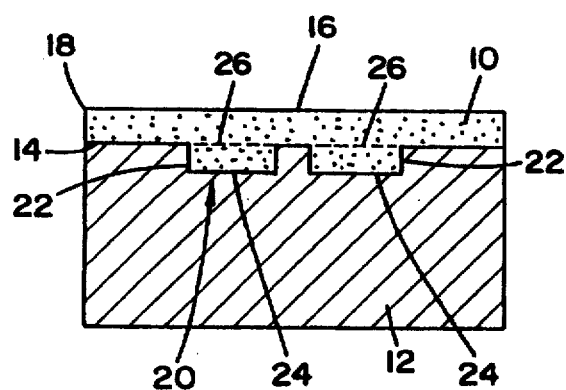

Embodiments of the invention will now be described with reference to the accompanying drawings. Referring first to FIGS. 1 and 2, a tool component comprises an abrasive compact layer 10 bonded to a cemented carbide substrate 12 along an interface 14. The abrasive compact layer 10 has an upper flat working surface 16 having a circular periphery 18 which provides a continuous cutting edge for the component.

A recess 20 extends from the interface 14 into the cemented carbide substrate 12. The recess is V-shaped in plan, as can be seen from FIG. 1, and has side walls 22 and a flat base 24. The intersection of the "V" has a portion 21 which is coincident with the periphery of the carbide substrate 12.

The recess 20 is filled with the same abrasive compact as that of the layer 10.

The compact-filled recess 20 has a portion, shown by the dotted lines 26 in FIG. 2, which is located in the interface 14. This portion 26 typically has an area at least 25 percent the area of the interface 14.

Figure 3:
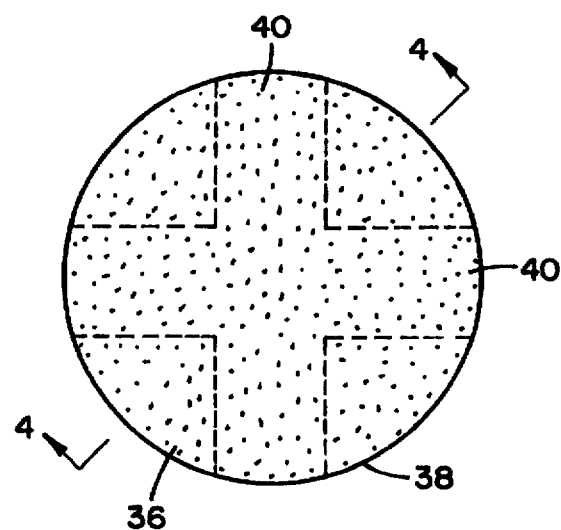
FIGS. 3 and 4 are plan and sectional side views, respectively, of a second embodiment of the invention.
Figure 4:
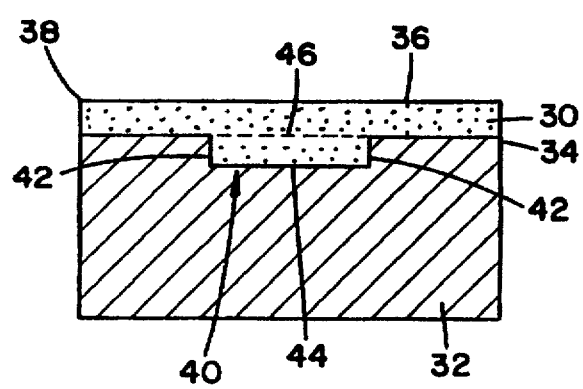

A second embodiment of the invention is illustrated by FIGS. 3 and 4. Referring to these figures, a tool component comprises an abrasive compact layer 30 bonded to a cemented carbide substrate 32 along an interface 34. The abrasive compact layer 30 has an upper working surface 36 which is flat and which has a circular periphery 38. It is this circular periphery 38 which provides a continuous cutting edge for the component.

A recess 40 extends into the substrate 32 from the interface 34. The recess 40 is cross-shaped, as can be seen from FIG. 3, and has side walls 42 and a flat base 44. The intersection of the cross lies wholly within the periphery of the carbide substrate 32.

The recess 40 has a portion, indicated by dotted lines 46 in FIG. 4, located in the interface 34. This portion typically has an area at least 25 percent the area of the interface.

The tool components illustrated above may be made by methods generally known in the art. For example, a cemented carbide substrate or green form thereof, may have an appropriately shaped recess formed in one surface thereof and the components necessary to produce an abrasive compact placed on the surface of the substrate which has the recess formed therein. This unbonded assembly is then subjected to the elevated temperature and pressure conditions required to produce an abrasive compact of the components. These conditions and the apparatus used for carrying out such a method are well known in the art.

We claim:

1. A tool component comprises an abrasive compact layer bonded to a cemented carbide substrate along an interface;

the abrasive compact layer having a working surface, on a side opposite to the interface, which is flat and which presents a cutting edge or point on its periphery;

a recess extending into the substrate from the interface, the recess having a shape, in plan, of at least two strips which intersect, each of said strips being of substantially constant cross section and having ends which form a surface in common with the periphery of the cemented carbide substrate; and a material filling the recess and being bonded to the substrate, the material being different to that of the substrate.

2. A tool component according to claim 1 wherein the intersection of the strips is located entirely within the periphery of the cemented carbide substrate.

3. A tool component comprises an abrasive compact layer bonded to a cemented carbide substrate along an interface;

the abrasive compact layer having a working surface, on a side opposite to the interface, which is flat and which presents a cutting edge or point on its periphery;

a recess extending into the substrate from the interface, the recess having a shape, in plan, of at least two strips, which intersect, and wherein the intersection of the strips has at least one surface which is common with the periphery of the cemented carbide substrate; and a material filling the recess and being bonded to the substrate, the material being different to that of the substrate.

4. A tool component according to claim 1 wherein the recess, in plan, is V-shaped.

5. A tool component according to claim 1 wherein the recess, in plan, is cross-shaped.

6. A tool component according to claim 1 wherein the recess has a portion which is located in the interface, that portion having an area at least 25 percent the area of the interface.

7. A tool component according to claim 6 wherein the area of the portion of the recess in the interface is less than 95 percent of the area of the interface.

8. A tool component according to claim 6 wherein the area of the portion of the recess in the interface is 40 to 75 percent the area of the interface.

9. A tool component according to claim 1 wherein the material filling the recess is abrasive compact which is the same as the abrasive compact layer.

10. A tool component according to claim 1 wherein the material filling the recess is a cemented carbide having diamond particles dispersed therein.

11. A tool component according to claim 1 wherein the material filling the recess is a cemented carbide having different characteristics to the cemented carbide of the substrate.

12. A tool component according to claim 1 wherein the abrasive compact layer is a diamond abrasive compact layer.

* * * * *